United States Patent [19]
Glader

[11] 3,814,834
[45] June 4, 1974

[54] ELECTRICAL OUTLET BOX

[76] Inventor: James Glader, 5433 Aldrich Ave., South, Minneapolis, Minn. 55430

[22] Filed: Nov. 13, 1972

[21] Appl. No.: 305,930

[52] U.S. Cl. .............................. 174/57, 220/3.7
[51] Int. Cl. ............................................. H02g 3/12
[58] Field of Search ............ 174/57, 53, 55; 220/3.7

[56] References Cited
UNITED STATES PATENTS

| | | | |
|---|---|---|---|
| 1,999,194 | 4/1935 | Hubbell | 174/57 UX |
| 2,297,862 | 10/1942 | Bachmann | 220/3.7 X |
| 3,038,141 | 6/1962 | Chiuchiolo | 174/53 X |
| 3,488,428 | 1/1970 | Smith | 174/55 X |

Primary Examiner—Bernard A. Gilheany
Assistant Examiner—David A. Tone

[57] ABSTRACT

An electrical outlet system in which an outlet box includes integrally formed connectors comprised of wells formed of insulating material and releasable conductive springs to receive and retain conductors and lateral grooves on opposed end walls adapted to be engaged by like opposed outwardly extending ribs on the ends of an electrical device such as a switch. One end of the electrical device includes an adjustment to releasably lock the device in the box. An extender for the box is provided with opposed dovetail tabs which serve to coact with dovetail grooves near the top of opposed side walls on the box. The extender may be installed or removed by moving its other opposed walls together.

11 Claims, 6 Drawing Figures

PATENTED JUN 4 1974  3,814,834
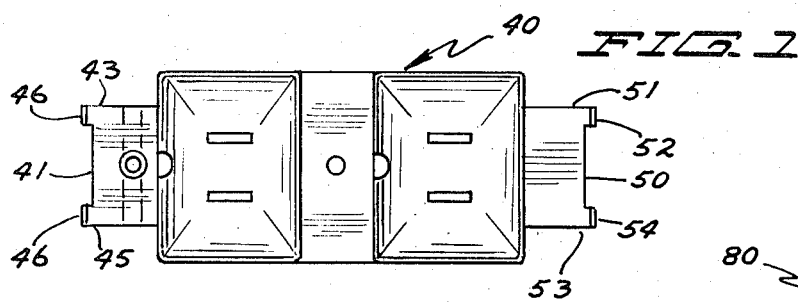
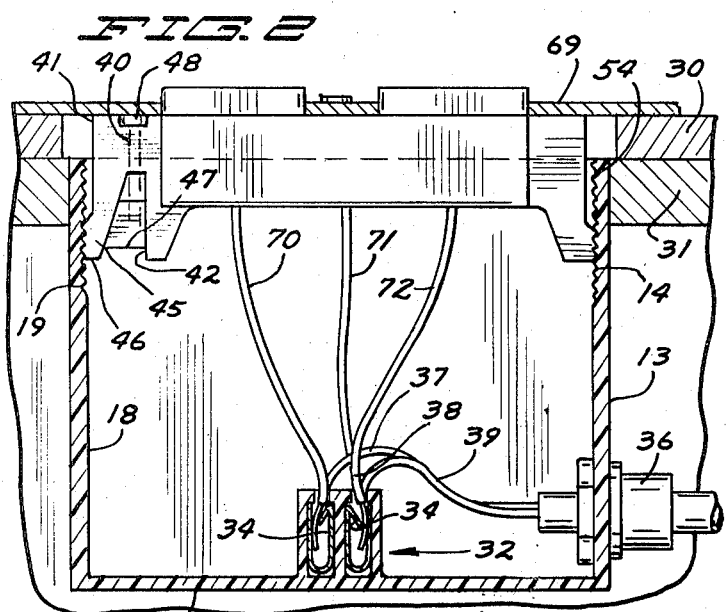
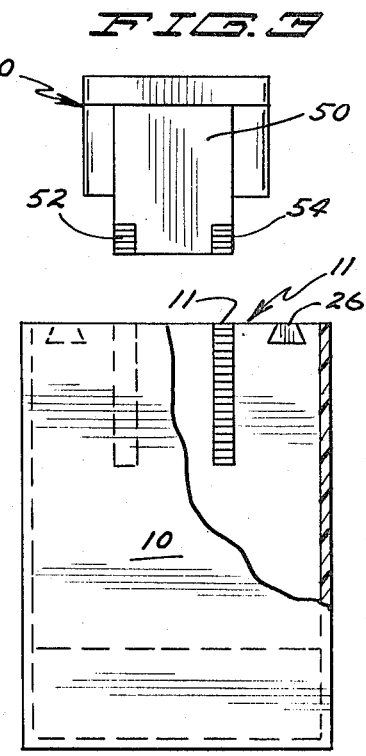
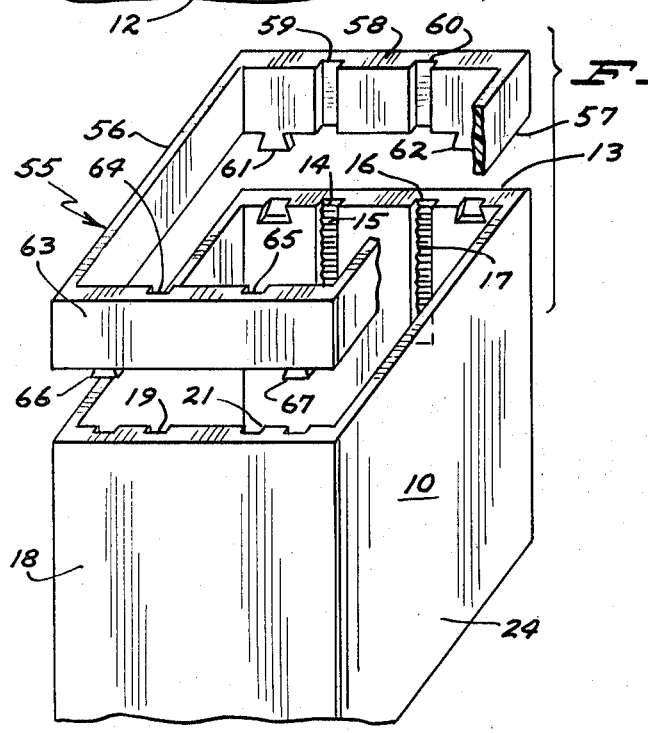
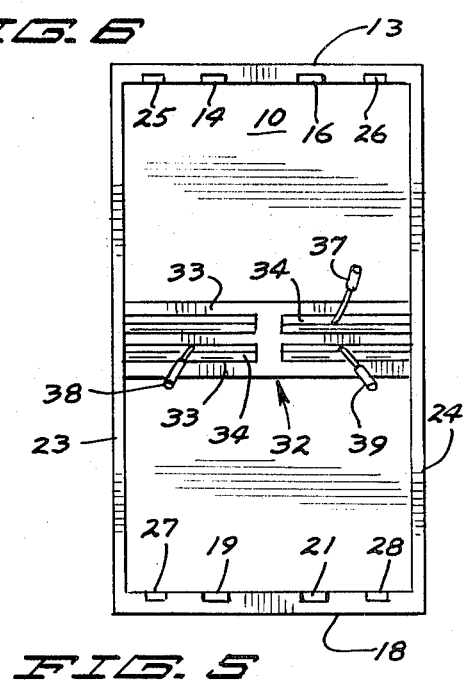

ELECTRICAL OUTLET BOX

SUMMARY OF THE INVENTION

My invention relates generally to electrical wiring systems and particularly directed to an electrical wiring system in which electrical devices such as electrical outlets, switches and the like may be mounted on electrical outlet boxes in such a manner as to provide for leveling to compensate for various misalignments that may occur.

In one embodiment of my invention an improved apparatus incorporates an outlet box comprised of plastic material which includes an integrally formed connecting means, an extender for the box that may be easily attached and removed, and incorporates an electrical utilization means or device, such as an outlet, that may be removably adjusted on the box so that it may be placed in a predetermined desired position with the surface of, for example, a wall.

The outlet box is provided with a plurality of wells comprised of insulating material which contain conductive spring members that are adopted to releasably conductively engage conductors that are inserted therein. The box also includes opposed columns of grooves on opposite end walls that are designed to coact with like opposed columns of ribs mounted on the ends of an electrical utilization device. One end of the electrical utilization device is provided with a releasable locking means so that the electrical utilization device may be pushed into the box so that the ribs and grooves are interengaged, the desired attitude established and the device locked in place. One or more extenders for the box may be disposed on the top of the box and these include suitably configured locking means on the extender and on the top inside periphery of the box so that when the sides of the extender are compressed together, it may be easily installed or removed from locking engagement with the top of the box.

These and other objects of my invention will become apparent from a consideration of the appended specification, claims, and drawings in which:

IN THE DRAWINGS

FIG. 1 is a top plan view of an electrical outlet assembly to which the principles of my invention have been applied;

FIG. 2 is a side sectional view of a complete box and outlet assembly installed in a wall of a structure;

FIG. 3 is an end view of the electrical outlet device shown in FIG. 1 of the drawings;

FIG. 4 is an end view looking toward the right on FIG. 2 of the drawing of the box portion only with part of an end wall removed to illustrate the invention;

FIG. 5 is a top view of the box shown in FIG. 4 of the drawings; and

FIG. 6 is a three-quarter top perspective of a box and an extender incorporating the principles of my invention.

Referring now to the drawings, there is shown a plastic box 10 having an open top 11, a closed bottom 12 and a pair of side walls 23 and 24. Box 10 is also provided with a first end wall 13 having a pair of inwardly opening slots 14 and 16 that are disposed generally parallel to the walls of box 10. Box 14 and 16 also include a plurality of laterally disposed grooves 15 and 17, respectively, for purposes to be described below. A pair of inwardly and upwardly opening dovetail slots 25 and 26 are disposed adjacent slots 14 and 16 for purposes also to be described below. End wall 13 is also shown as having a suitable bushing 36 extending therethrough through an aperture (not shown) for the purposes of receiving and engaging a cable containing a plurality of wires 37, 38 and 39.

The other end wall 18 includes a pair of similarly disposed inwardly opening slots 19 and 21, each having laterally extending grooves 20 and 22 for purposes to be described below. End wall 18 also includes a pair of inwardly and upwardly opening dovetail slots 27 and 28 for purposes to be described below. Box 10 also includes a connector 32 disposed approximately at the center and extending upwardly of bottom 12. Connector 32 includes a plurality of wells 33, each of which is provided with a spring 34 in the configuration shown for engaging and conductively retaining conductors that may be pushed therein as shown generally in FIGS. 2 and 5 of the drawings. Box 10 is also shown disposed in an opening formed in a wall 31 which may be covered by a paneling or the like 30.

Box 10 may be suitably disposed and held in position in a structure by means (not shown) which is it being understood that electrical boxes of this type are normally disposed and held in predetermined relationship to, for example, a wall 31 or the paneling 30 or other structural member of a building or the like. Such fastening may take the form of screws, bolts, tabs, etc.

An electric current utilization device is shown in the form of an electrical outlet 40 and it is desired to dispose such a device in parallel relationship with and at a predetermined height to paneling 30 so as to effect a neat and safe position of the electrical device in a structure. Outlet 40 includes a first end 41 having a downwardly opening laterally extending tapered slot 42 and a pair of outwardly extending spaced apart elongated portions 43 and 45, each having transversely extending ribs at the lower extremities thereof adjacent to tapered slot 42. A wedge member 47 is shown slidably disposed in tapered slot 42 and may be adjusted in accordance with the position of a screw 48 threadably received in wedge 47. Screw 48 extends upwardly to the top surface of outlet 40 through a suitable hole 49. Outlet 40 also includes a second end 50 having a pair of outwardly extending laterally spaced portions 51 and 52 each having a plurality of laterally disposed ribs adjacent the lower ends thereof.

In connection with certain installations requiring a deeper box than that which may have originally been installed, an extender 55 may be utilized to increase the depth of box 10 between its bottom 12 and top opening 11. Extender 55 includes a pair of flexible side portions 56 and 57. It further includes a first end portion 58 having a pair of parallel slots 59 and 60 adapted to overlie slots 14 and 16 in end wall 13 on box 10 and a pair of downwardly depending dovetail tabs 61 and 62 adapted to be removably received in dovetail slots 25 and 26 in end wall 13. The other end of extender 55 includes similar parallelly disposed slots 64 and 65 and downwardly depending dovetail tabs 66 and 67.

Outlet 40 may also include molded in conductors that are internally connected through means not shown to appropriate connectors in a conventional configuration for an outlet through means not shown, such conductors may comprise those indicated by reference characters 70, 71 and 72.

Outlet 40 may also include means for receiving a cover plate 69 which extends over the top of outlet 40 and outwardly onto panel wall 30 to completely seal and cover the aperture in wall 31 and panel wall 30.

As may be seen from the drawings, box 10 is comprised entirely of plastic of suitable electrical and mechanical characteristics. Likewise, extender 55 is comprised of the same or similar plastic to box 10 and outlet device 40 is comprised of an external housing of plastic having suitable mechanical and electrical insulating properties. Outlet cover 69 is also normally comprised of a suitable plastic material.

In a typical installation, a box 10 is secured in the wall ceiling or floor of a structure with its open top end 11 adjacent to a wall 31. Cabled conductors having the desired numbers of conductors therein are extended between like boxes 10 and may be connected thereto by suitable bushings 36 which extend into the interior of box 10. The ends of the individual conductors in the cables are stripped of insulating material and are pushed into separate wells 33 into conductive retaining engagement of springs 34. An outlet 40, or similar device, is also provided with a plurality of conductors, in the illustrated embodiment, conductors 70, 71 and 72, and these are likewise stripped of insulation at their outer extremities and pushed into corresponding wells 33 into conductive retaining engagement with spring 34 so that corresponding conductors in the cable are connected to like corresponding conductors from the outlet 40. Outlet 40 is then disposed over the slots containing the lateral grooves in the end walls of box 10 and screw 48 is used to position wedge 47 so as to allow the lower extremities of portions 43, 45, 51 and 53 to flex inwardly as the ribs thereon engage the grooves as outlet device 40 is moved downwardly into box 10 to a position which will present its top surface adjacent the plug receiving slots parallel with the outer surface of panel wall 30 so that when a cover plate 69 is installed thereon, it will abut the outer side of panel wall 30 around the entire periphery of the aperture formed therein. It may be seen that by using a pair of parallel slots and corresponding spaced apart portions on the electrical outlet device, a two axis adjustment may easily be obtained. When outlet device 40 is in the position desired, screw 48 is used to draw wedge 47 up into tapered slot 42 to lock the same in position and to removably retain outlet 40 in the desired position of parallelism and at the proper height.

When it is necessary or desired to use an extender on a box 10, an extender configured like that of extender 55 is grasped at the center of the side wall portions which are then moved inwardly toward the center of extender 55 to cause end wall portions to move toward the center also so that dovetail tabs 61, 62, 66 and 67 are moved far enough inwardly to clear the dovetail slots in the top edge of the end walls on box 10. Releasing the pressure allows the extender to assume its normal shape and configuration of the side and end walls of box 10 and devices to be disposed therein may move freely through the slots provided in the interior end walls of extender 55 generally in the manner described above.

Having now therefore fully illustrated and described my invention, what I claim to be new and desire to protect by Letters Patent is:

1. Electrical apparatus comprising in combination;
   an open ended housing including at least one inwardly opening parallel, groove in opposite walls thereof adjacent said open end; and
   current utilization means including spaced apart end walls having complimentary positioned end portions with at least one outwardly extending rib in engagement with the grooves in said housing, one end of said last named means being adjustable longitudinally of said means.

2. The apparatus of claim 1 in which the end portions on the current utilization means are comprised of a pair of laterally spaced apart columns.

3. The apparatus of claim 2 in which the opposed parallel grooves are divided into a pair of laterally spaced apart columns.

4. The apparatus of claim 3 in which said one end of the current utilization means includes a tapered groove and a wedge operable therein to longitudinally extend said one end to lock and unlock said means in the housing.

5. The apparatus of claim 2 in which one end of the current utilization means includes a tapered groove and a wedge operable therein to longitudinally extend said one end to lock and unlock said means in the housing.

6. The apparatus of claim 1 in which the housing is comprised of an insulating material and includes a plurality of wells, each having spring biased conductive means for releasably conductively engaging at least one conductor.

7. The apparatus of claim 6 in which the housing is comprised of at least two parts, one of which is removably disposed on the open end by at least two complimentary shaped locking members that are in normal locking engagement at opposed end walls thereof and are disengaged by moving the other sidewalls toward one another.

8. The apparatus of claim 1 in which the housing is comprised of at least two parts, one of which is removably disposed on the open end by at least two complimentary shaped locking members that are in normal locking engagement at opposed end walls thereof and are disengaged by moving the other sidewalls toward one another.

9. The apparatus of claim 8 in which the end portions of the current utilization means and the opposed parallel grooves are divided into a pair of laterally spaced apart columns and said one part of the housing includes a like pair of opposed parallel opening grooves in alignment with the columns of the grooves of said housing.

10. The apparatus of claim 1 in which one end of the current utilization means includes a tapered groove and a wedge operable therein to longitudinally extend said one end to lock and unlock said means in the housing.

11. The apparatus of claim 7 in which the housing is comprised of an insulating material and includes a plurality of wells, each having spring biased conductive means for releasably, conductively engaging at least one conductor.

* * * * *